(12) United States Patent
Günther (10) Patent No.: US 12,224,451 B2
(45) Date of Patent: Feb. 11, 2025

(54) BATTERY HOUSING FOR A VEHICLE DRIVEN BY AN ELECTRIC MOTOR

(71) Applicant: Kirchhoff Automotive Deutschland GmbH, Attendorn (DE)

(72) Inventor: Alexander Günther, Olpe (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 398 days.

(21) Appl. No.: 17/779,852

(22) PCT Filed: Nov. 27, 2020

(86) PCT No.: PCT/EP2020/083586
§ 371 (c)(1),
(2) Date: May 25, 2022

(87) PCT Pub. No.: WO2021/105328
PCT Pub. Date: Jun. 3, 2021

(65) Prior Publication Data
US 2023/0006297 A1  Jan. 5, 2023

(30) Foreign Application Priority Data
Nov. 29, 2019  (DE) ..................... 10 2019 132 450.5

(51) Int. Cl.
*H01M 50/242* (2021.01)
*B60K 1/04* (2019.01)
(Continued)

(52) U.S. Cl.
CPC ............ *H01M 50/242* (2021.01); *B60K 1/04* (2013.01); *B60L 50/64* (2019.02);
(Continued)

(58) Field of Classification Search
CPC ............ H01M 50/242; H01M 10/625; H01M 10/6556; H01M 50/231; H01M 50/249;
(Continued)

(56) References Cited

U.S. PATENT DOCUMENTS 10,424,770 B2 * 9/2019 Günther ................ H01M 50/24
10,723,234 B2 * 7/2020 Günther ................ B60L 50/66
(Continued)

FOREIGN PATENT DOCUMENTS

DE  102011107607 A1  1/2013
DE  102015008942 A1  1/2017
(Continued)

OTHER PUBLICATIONS

International Search Report mailed Apr. 4, 2021 in parent international application PCT/EP2020/083586.
(Continued)

*Primary Examiner* — Jacob B Meyer
(74) *Attorney, Agent, or Firm* — Polson Intellectual Property Law P.C.; Margaret Polson; Christopher Sylvain (57) ABSTRACT

A battery housing for a vehicle driven by an electric motor to be installed in the floor region of a vehicle. The battery housing has a frame, which encloses at least one battery module, and a floor, which is connected to the frame. The floor takes the form of a sandwich construction and forms hollow chambers, which can be used as temperature-control channels for guiding through a fluid by virtue of end-side openings in adjacent hollow chambers being connected to one another at their two ends.

14 Claims, 6 Drawing Sheets

(51) Int. Cl.
    *B60L 50/64*       (2019.01)
    *H01M 10/625*     (2014.01)
    *H01M 10/6556*    (2014.01)
    *H01M 50/231*     (2021.01)
    *H01M 50/249*     (2021.01)

(52) U.S. Cl.
    CPC ..... *H01M 10/625* (2015.04); *H01M 10/6556* (2015.04); *H01M 50/231* (2021.01); *H01M 50/249* (2021.01); *B60K 2001/0438* (2013.01); *H01M 2220/20* (2013.01)

(58) Field of Classification Search
    CPC ................ H01M 2220/20; B60K 1/04; B60K 2001/0438; B60L 50/64
    See application file for complete search history.

(56) References Cited

U.S. PATENT DOCUMENTS

| | | | | |
|---|---|---|---|---|
| 10,763,472 | B2* | 9/2020 | Günther | H01M 50/224 |
| 10,843,577 | B2* | 11/2020 | Günther | B60K 1/04 |
| 10,985,422 | B2* | 4/2021 | Günther | H01M 50/276 |
| 11,075,416 | B2* | 7/2021 | Günther | H01M 50/204 |
| 11,108,112 | B2* | 8/2021 | Günther | H01M 50/258 |
| 11,177,526 | B2* | 11/2021 | Günther | B60K 1/04 |
| 11,201,370 | B2* | 12/2021 | Hilfrich | B60L 50/66 |
| 11,205,816 | B2* | 12/2021 | Günther | H01M 50/262 |
| 2016/0164148 | A1* | 6/2016 | Yum | H01M 10/6551 |
| | | | | 429/120 |
| 2017/0176108 | A1* | 6/2017 | Palanchon | H01M 10/6567 |
| 2018/0062224 | A1* | 3/2018 | Drabon | H01M 10/625 |
| 2021/0143497 | A1* | 5/2021 | Günther | H01M 10/625 |
| 2021/0265690 | A1* | 8/2021 | Günther | H01M 50/207 |
| 2021/0384581 | A1* | 12/2021 | Gündogan | H01M 50/209 |
| 2023/0006297 | A1* | 1/2023 | Günther | H01M 50/242 |

FOREIGN PATENT DOCUMENTS

| | | |
|---|---|---|
| DE | 102016213832 A1 | 2/2018 |
| DE | 102017103653 A1 | 8/2018 |
| DE | 102017119436 A1 | 2/2019 |

OTHER PUBLICATIONS

Written Opinion of the International Searching Authority mailed Apr. 4, 2021 in parent international application PCT/EP2020/083586.

Unpublished U.S. Appl. No. 17/636,959, filed Feb. 21, 2022, inventor Gundogan et al., applicant Kirchhoff Automotive Deutschland GmbH.

Unpublished U.S. Appl. No. 17/636,321, filed Feb. 17, 2022, inventor Gunther et al., applicant Kirchhoff Automotive Deutschland GmbH.

Unpublished U.S. Appl. No. 17/635,955, filed Feb. 21, 2022, inventor Gunther et al., applicant Kirchhoff Automotive Deutschland GmbH.

\* cited by examiner

BATTERY HOUSING FOR A VEHICLE DRIVEN BY AN ELECTRIC MOTOR

BACKGROUND

The present disclosure relates to a battery housing for a vehicle driven by an electric motor, to be installed in the floor region of the vehicle.

Vehicles driven by electric motors, such as electric vehicles or hybrid vehicles, are equipped with powerful and spacious battery modules. These are typically located in the floor region of the vehicle to keep the vehicle's center of gravity close to the ground. The battery modules are arranged in a battery housing. The battery housing has a frame with a floor connected thereto. The battery housing can be composed of a frame part and a floor, but embodiments are also conceivable in which a trough, which has a peripheral frame and a floor formed thereon, is used as the battery housing. Typically, the battery modules in the battery housing are attached to the frame and rest on the floor of the battery housing. The battery modules are typically lithium-ion batteries, typically high-voltage batteries. These battery modules must not be damaged. In the event of damage, the risk thereby posed is not insignificant. Battery housings of this type are designed with regard to the frames or frame structures thereof in order to handle or absorb lateral impact forces, at least to a certain extent, without damaging the battery modules contained therein. However, due to insufficient installation height, the floor of a battery housing cannot be protected with the hollow chamber profiles that are typically used as the frame structures. Collision protection is therefore desired because, in the event the floor of the vehicle's battery housing makes contact with an obstacle, deformation of the battery modules contained therein should also be avoided, particularly in the case of battery housings with a large surface area.

DE 10 2017 119 436 A1 discloses a battery housing in which the floor is formed from an extruded aluminum hollow chamber profile. This provides a structure that has sufficient rigidity for collision protection.

If greater rigidity is desired, other materials, such as high-strength alloys, are also used to provide collision protection. For example, high-strength titanium plates are also used for this purpose. However, these have the disadvantages of high costs, increased processing effort, and a higher weight.

A temperature-control device for a battery housing is known from DE 10 2015 008 942 A1. This device is located in the floor region of the battery housing or forms it. The temperature-control device comprises two sheets with a corrugated profile, which are arranged one above the other at right angles with respect to the longitudinal extension of the profile of the channels formed therewith. The profiled sheets lie loosely on top of each other to provide glide paths to allow limited deformation. In the event of contact, forces acting on the floor should be dissipated via the sliding paths and not be passed on to the interior of the battery housing.

DE 10 2017 103 653 A1 discloses a battery housing which has two floor sheets spaced apart from one another. A profiled reinforcement sheet is arranged between these floor sheets.

DE 10 2011 107 607 A1 discloses a cooling plate that is attached to the top of a battery housing.

DE 10 2016 213 832 A1 discloses a battery housing made from an extruded profile.

SUMMARY

Proceeding from this background, an aspect of the present disclosure is to provide a battery housing which is equipped with lightweight collision protection which can be produced inexpensively and which also only requires a small amount of installation space.

This is achieved by a battery housing of the type mentioned at the outset, comprising a frame enclosing at least one battery module and a floor connected to the frame, wherein the floor is equipped with collision protection and designed as a sandwich construction which comprises a lower sheet, an upper sheet spaced apart from the lower sheet, and a structural sheet positioned in between and connected to the lower sheet and to the upper sheet, wherein the structural sheet is formed, at least in sections in its cross-section, from a repeating sequence comprising a first contact section, a first bridging section, a second contact section, and a second bridging section, wherein the first contact section is connected to the lower sheet and the second contact section is connected to the upper sheet, and wherein the bridging sections each have a first contact section connected to the lower sheet with a second contact section connected to the upper sheet, wherein hollow chambers formed by the upper sheet and the structural sheet with its bridging sections and the second contact sections connecting them are usable as temperature-control channels for conducting a fluid, and end-side openings of adjacent hollow chambers are connected to one another at the two ends thereof.

The floor is designed in a sandwich construction in the manner described. The special sandwich construction not only ensures a simple and inexpensive structure, but also creates an especially effective reinforcement of the floor, which means that the floor is equipped with collision protection that only requires a small amount of installation space, but still has an especially high level of rigidity.

The sandwich construction includes a lower sheet and an upper sheet. The two sheets are arranged at a distance from one another. They represent the outer straps of the sandwich construction. A structural sheet is arranged between these two sheets, by means of which structural sheet the two sheets are connected to one another in a manner that is resistant to tension, pressure, and shear. The profile of the structural sheet is corrugated in its cross-section at least in sections. The profiling consists of a repeating sequence of structural sections. Such a sequence of sections includes the following sections, which transition into one another in the following order: a first contact section, a first bridging section, a second contact section, and a second bridging section.

The first contact section is connected to the lower sheet. The second contact section is connected to the upper sheet. The two contact sections lie against the lower or upper sheet over a certain extension in the cross-sectional direction of the structural sheet. The structural sheet thus makes contact with the lower sheet and the upper sheet with a respective surface contact. The two bridging sections are arranged in the distance direction of the upper sheet to the lower sheet and connect the contact sections to each other. The sequence of sections described above can, of course, also begin at another section, for example the first bridging section. The sequence of sections then extends up to (and includes) the first contact section. In the sequence of structural sections described, the bridging sections are spaced apart from one another by the width of the second contact section. According to a first embodiment, the profiling of the structural sheet extends over the entire longitudinal extension of the structural sheet. Due to this structuring, the structural sheet has a form of alternating channels which open to the lower sheet and the upper sheet in an alternating manner.

In another embodiment, the structural sheet has local support projections. These are typically arranged in the manner of a grid. These support projections can be introduced into a blank to form the structural sheet by means of an embossing or deep-drawing process. A first contact section is provided on the outside of such a support projection, and a second contact section is provided by the surface area of the structural sheet.

If it is not produced in one piece as part of the structural sheet, such a support projection can also be glued onto the structural sheet and made from a material that is different than that of the structural sheet. It is also possible to design the support projections as solid cylinders, for example glued onto a floor sheet of the structural sheet.

The orientation of the bridging sections between the two sheets extends in the direction of the distance between the two sheets. The term "distance direction" used in the context of these statements is to be understood as meaning the direction in which a first contact section is connected to a second contact section by means of a bridging section. In the end section thereof which transitions into the adjoining contact section, the bridging sections have a transition section that is designed with a radius.

Provision can preferably be made for the angular extension of the radius to be 70° or more. If the transition sections located opposite one another do not transition directly into one another, the section located in between is typically straight and forms an angle of 90°±10° with the two sheets. The distance direction is therefore the direction in which the forces to be taken into account, acting orthogonally from the outside on the lower sheet, are transferred to the upper sheet in or largely in the direction of force flow. The transition sections preferably extend over 80°, more preferably over 85°, and especially preferably over 90° in relation to the contact sections. Depending on the distance between the upper and lower sheets, the transition sections of the bridging sections can transition into one another. In many cases, in order to achieve the desired distance between the two sheets, a straight middle section will be included between the transition sections of the bridging sections, which middle section preferably extends at right angles to the two sheets. An inclination of 5° to 10° is tolerable, especially if the extension of the middle section in the direction of the thickness of the sandwich construction is less than the extension of the transition sections in this direction. The radii of the transition sections of the bridging sections in the transition to the contact section connected to the lower sheet or to the upper sheet can be different, for example in order to simplify the production process.

The functionality of the floor sandwich construction can be adjusted depending on the inclination of the bridging sections as relates to the planar extension of the lower or upper sheet. If the bridging sections border at right angles to the lower or upper sheet or only deviate therefrom by a few angular degrees, the floor sandwich construction is stiffer against loads in the direction of the height thereof, compared to a design in which the bridging sections form a significantly smaller angle with the two sheets. Especially in the latter case, the bridging sections can be used for energy absorption. In particular, if the structural sheet is structured by support projections, energy is absorbed equally when the support projections are arranged according to a grid, regardless of the direction of action. In such a case, a material suitable for this purpose will be used to design the structural sheet.

As has already been pointed out, the contact sections are planar, thus connected to the upper and lower sheet with at least a section of the extension thereof in the width direction and over the length thereof continuously or via several or a plurality of connection points spaced apart from each other. In the sections of the upper and lower sheets where the contact sections of the structural sheet are connected, the upper and lower sheets are reinforced due to the greater cumulative material thickness. A hollow profile constructed in a shell structure, typically with an approximately rectangular cross-sectional area, is provided in the remaining sections.

Due to the transition sections pointing in the distance direction compared to the upper and lower sheet, an increased moment of resistance in the transverse direction as relates to the profiling direction of the structural sheet is designed to be especially stiff, due to the structuring, against a force acting from below. The connection of the contact sections to a sheet suppresses sliding movements between the contact sections and the respective sheet, which is why this floor has a particular rigidity also in the transverse direction as relates to the longitudinal extension of the contact sections of the structural sheet.

In a preferred embodiment, the contact sections are connected to the respective adjacent upper or lower sheet in the cross-section of the contact sections, over the entire width thereof or over as much of the width thereof as possible, in a manner resistant to shear, pressure, and tension.

In a further embodiment, the first contact sections of the structural sheet, which are connected to the lower sheet, are glued to the latter, whereas the second contact sections are soldered to the upper sheet. The material connection between the structural sheet and the upper and lower sheet results in an even distribution of force. In addition, the adhesive layer can provide a thermal insulation effect between the lower sheet and the structural sheet.

In some embodiments, the hollow chambers formed by the upper sheet and a structural sheet with a wavy cross-sectional profile, the contact sections of which follow the longitudinal or transverse extension of the floor, are used as temperature-control channels for conducting a fluid, typically for cooling the battery modules located in the battery housing. For this purpose, the end-side openings of the channels are connected to one another and connected to a coolant circuit. It is advantageous to use these hollow chambers, which are already present due to the special sandwich construction, since the battery modules typically rest on the upper sheet. Due to the course of the structural sheet, only a small material thickness thereof is required, so that the temperature-control channel arrangement formed by the structural sheet and the upper sheet has only a low heat-storing mass and is therefore especially effective.

If the structuring of the structural sheet is provided by a wavy profile, the contact sections of which follow the longitudinal extension of the floor, the end-side openings of the hollow chambers formed thereby can open into a common collector on each side of the floor. Moreover, it is possible to interconnect several individual hollow chambers and to connect them to a corresponding number of further channels by means of a deflection collector. In another embodiment, two adjacent hollow chambers are connected to each other. In this way, the temperature-control fluid flows into a hollow chamber at a distal end from a hollow chamber adjacent on one side and flows out at its other distal end into a hollow chamber adjacent on the other side, resulting in a meandering temperature-control line.

For temperature control, it is not absolutely necessary for all of the hollow chambers formed by the structural sheet and the upper sheet to be used as fluid channels. It is quite possible that only a part of the available hollow chambers is used for the intended temperature control.

The embodiment of a floor sandwich construction, in which the first contact section of the structural sheet is glued to the lower sheet and the second contact section of the structural sheet is soldered to the upper sheet, is especially effective for temperature control of the battery housing interior. On the one hand, soldering the upper sheet to the structural sheet results in especially good heat transfer between the sheets forming the hollow chambers, while, on the other hand, heat insulation is provided by the adhesive between the structural sheet and the lower sheet.

In a further embodiment, the upper sheet is thinner than the lower sheet. This design of the floor ensures that local deformations of the lower sheet, such as indentations, are avoided. Due to the sandwich construction, however, it is not necessary for the upper sheet to be correspondingly thick. An upper sheet that is thinner in terms of its thickness is advantageous in the case of temperature control of the floor.

In a further embodiment, it is provided that, in the cross-section of the structural sheet, the contact sections that are connected to the upper sheet have a smaller width than the contact sections with which the structural sheet is connected to the lower sheet. The free cross-sectional area of the hollow channels delimited by the upper sheet is then correspondingly larger, which in turn is favorable in the case of temperature control of the floor.

The distance between the upper sheet and the lower sheet is preferably less than the width of the contact sections of the structural sheet. Typically, the transition sections are shorter than the critical buckling length according to Euler, with a buckling length factor of 0.5 being assumed (the element to be buckled is clamped on both sides). The critical buckling length according to Euler is decisive as to whether or not this buckling occurs when the transition sections are loaded with a predetermined force. One skilled in the art is sufficiently familiar with Euler's buckling cases such that detailed explanations are not necessary at this point.

In another embodiment, the bridging sections of the structural sheet are longer than the critical buckling length of same. In addition, it can be provided that the structural sheet is made of a crash alloy, such as a special aluminum alloy. In this way, a crash element is formed by the floor of the battery housing, with the transition sections being deformed in the event of a crash and thus being able to handle or absorb energy.

BRIEF DESCRIPTION OF THE DRAWINGS

The present disclosure is described below on the basis of example embodiments with reference to the appended figures, wherein.

DETAILED DESCRIPTION

Figure 1:
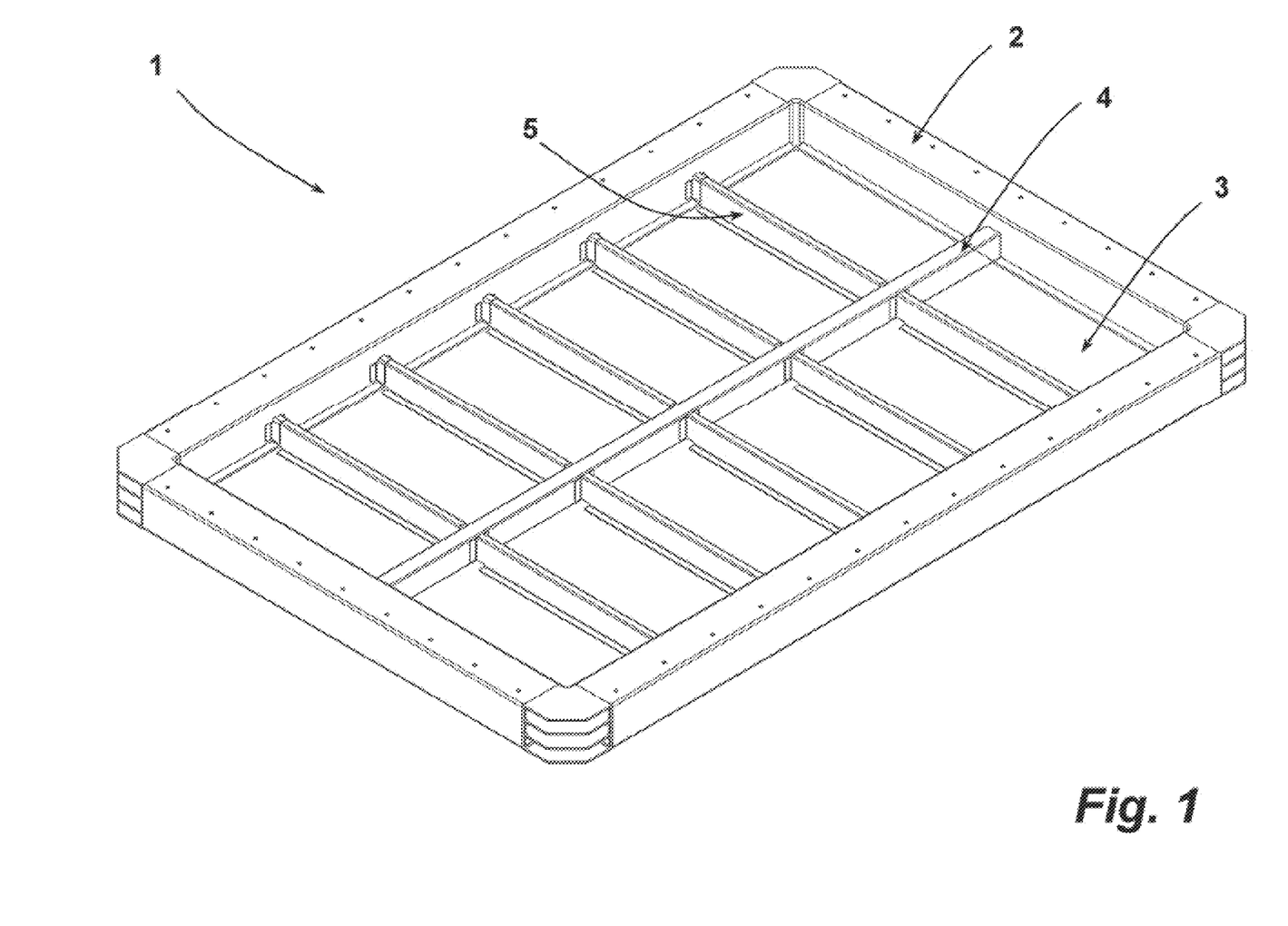
FIG. 1 is perspective view of a battery housing according to the present disclosure.

FIG. 1 shows a battery housing 1. This can be closed by a cover, which is not shown in the figures. The battery housing includes a frame 2 and a floor 3. The frame 2 is formed by a peripheral support structure. The frame 2 is equipped on the inside with reinforcement struts 4, 5, one of the reinforcement struts being a longitudinal strut 4, through which the two narrow sides of the frame 2 are connected to one another. The cross struts 5 connect the longitudinal sides of the frame 2 to one another. For the sake of clarity, only one cross strut 5 is identified by the reference numeral in FIG. 1 as an example. The struts 4, 5 are connected to the sides of the frame 2 facing the inside of the battery volume and also to the floor 3 by means of flanges. The longitudinal strut 4 is designed as a continuous strut in the example embodiment shown. The cross struts 5 extend between the frame 2 and the longitudinal strut 4, two cross struts 5 each being arranged in alignment with one another with respect to the longitudinal axis thereof, separated by the longitudinal strut 4. The struts 4, 5 form a compartment. Battery modules can be inserted into this compartment. Each compartment represents a battery module slot. The battery modules are connected to the frame 2, the cross struts 5, and/or the longitudinal strut 4. A special feature of the battery housing 1 is the floor 3 thereof. This is explained below.

Figure 2:
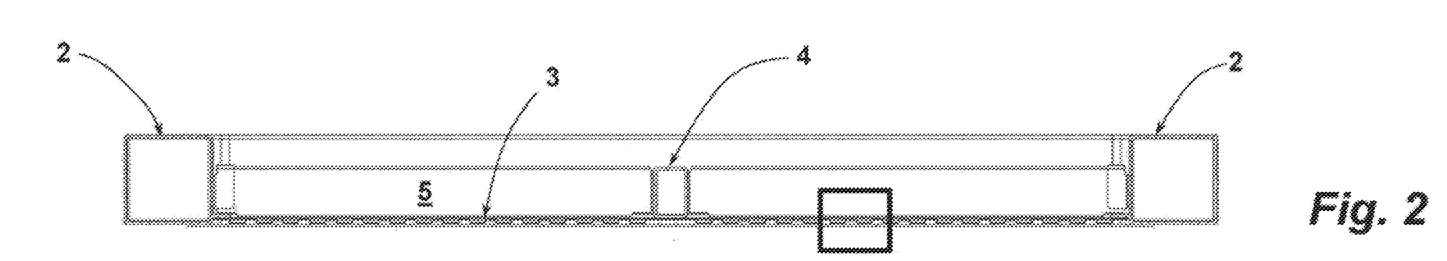
FIG. 2 is a cross-section through the battery housing shown in FIG. 1.

FIG. 2 shows a cross-section in the transverse direction, parallel to the narrow sides of the battery housing 1 of FIG. 1. The floor 3 is connected to the frame 2, which is provided from profiled pieces of the hollow chamber, and connected to the longitudinal strut 4 and the cross struts 5. The floor 3 is a sandwich construction, which is explained below with reference to FIG. 3.

Figure 3:
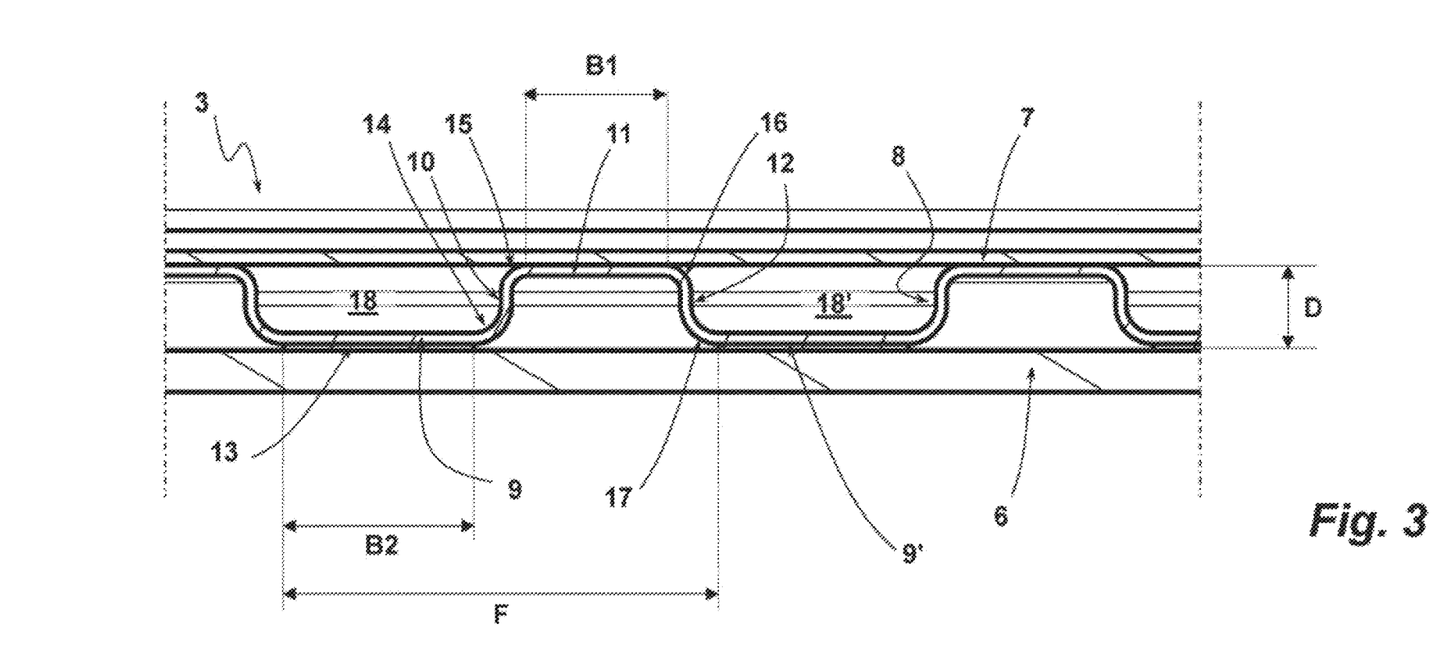
FIG. 3 is an enlarged section of FIG. 2.

FIG. 3 shows an enlarged section of the floor 3 shown in FIG. 2. Since the battery housing 1 is to be installed in the floor region of a motor vehicle, the floor 3 is equipped with collision protection. For this purpose, the floor 3 is designed in a sandwich construction. The sandwich construction comprises a lower sheet 6 and an upper sheet 7 spaced apart from the lower sheet 6 by a distance D. These two sheets 6, 7 are flat sheets. The upper sheet 7 delimits the inside of the battery housing together with the frame 2 and the cover, which is not shown in detail. The lower sheet 6 has a greater material thickness than the upper sheet 7. In the example embodiment shown, the material thickness of the lower sheet 6 is approximately three times the material thickness of the upper sheet 7. The lower sheet 6 is preferably made of aluminum. Hardened steel may also be used for higher strength requirements.

A structural sheet 8 is connected between the two sheets 6, 7. The two sheets 6, 7 are spaced apart from one another by the structural sheet 8. The structural sheet 8 is connected to both sheets 6, 7 in a manner resistant to shear, pressure, and tension. The structural sheet 8 is profiled in a meandering manner by means of U-shaped sections which are open toward the other side in an alternating manner. In its cross-sectional course shown in FIG. 3, the profile is formed from a repeating sequence F comprising a first contact section 9, a first bridging section 10, a second contact section 11, and a second bridging section 12. The first contact section 9 is connected to the lower sheet 6, namely by means of an adhesive 13 in the example embodiment shown. The second contact section 11 is connected to the upper sheet 7 by a soldered connection. Both contact sections 9, 11 are connected to the respective sheet 6, 7 over their entire contact surface, consequently over the widths B1, B2 thereof, which are discernible in the cross-section thereof, and also over the length thereof.

The bridging sections 10, 12 connect the contact sections 9, 11, 9' in the distance direction. For this purpose, they are arranged at right angles to the contact sections 9, 11. The first bridging section 10 is connected to the contact sections 9, 11, and the second bridging section 12 is connected to the second contact section 11 and first contact section 9' of the following sequence of structural sections.

The bridging sections 10, 12 transition into the contact sections 9, 9', 11 with a radius 14, 15, 16, 17 in each case. The radii 14, 15, 16, 17 are part of the bridging sections 10, 12 and are formed by the respective end sections of the bridging sections 10, 12. In the example embodiment shown, there is a short, straight middle piece arranged at right angles to the sheets 6, 7, between radii 14, 15 or 16, 17, respectively, which are opposite one another in the thickness extension. This middle piece is arranged at right angles to the sheets 6, 7. The radii 14, 17 in the transition sections of the bridging sections 10, 12, which connect to the first contact sections 9, 9', are designed with a larger radius than the radii 15, 16 with which the bridging sections 10, 12 adjoin the first contact sections 11.

The distance D between the upper sheet 7 and the lower sheet 6 is smaller than the smaller of the two different widths B1, B2 of the contact sections 9, 11. In the example embodiment shown, the distance D corresponds to approximately half of width B1 of contact sections 11 and approximately one-third of width B2 of contact sections 9. This achieves a sandwich construction that is especially resistant to buckling.

In this example embodiment, the hollow chambers 18, 18' (FIG. 3) formed by the structural sheet 8 and the upper sheet 7 are used as temperature-control channels for conducting a temperature-control fluid in order to cool or heat the interior of the battery housing. In most cases, cooling should be the priority. For effective temperature control, the second contact sections 11 of the structural sheet 8 are connected to the upper sheet 7 by the soldered connections already described above. Due to the unequal width B1, B2 of the contact sections 9, 11, with contact sections 9 being wider in this regard, the hollow channels 18, 18' have a larger cross-sectional area, so that a larger volume flow can be conveyed therethrough. It should be noted here that the thickness of the upper sheet 7 is about 1 mm and that of the lower sheet 6 is about 3 mm, and the distance D between the two sheets 6, 7 in the example embodiment shown is about twice the thickness of the lower sheet 6 and thus is about 5 mm. Therefore, the above-described wider design of the hollow channels 18, 18' is advantageous against the backdrop of the only slight free height available for increasing the flow through the hollow channels 18, 18'. The contact surface of the fluid conveyed through the hollow chambers 18, 18' with the wall sections enclosing the hollow chambers 18, 18' is correspondingly larger, and correspondingly more fluid can be conveyed through the hollow chambers 18, 18'. The adhesive 13 located between the first contact sections 9 and the lower sheet 6 prevents direct contact of the structural sheet 8 with the lower sheet 6. In this way, the structural sheet 8 is thermally insulated from the lower sheet 6, which also promotes the effectiveness of temperature control of the battery modules contained in the battery housing 1.

Figure 4:
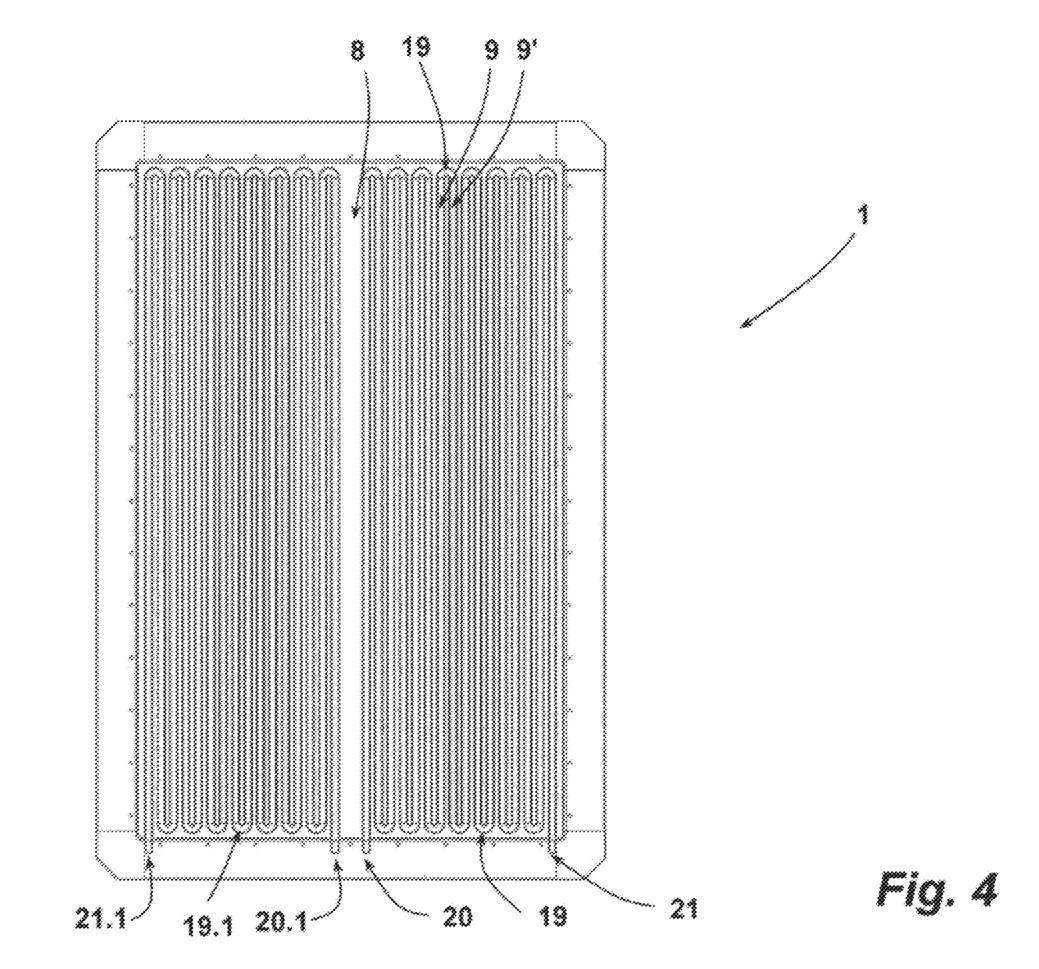
FIG. 4 is an underside view of the battery housing of FIG. 1, with the lower sheet of the floor omitted.

FIG. 4 shows a view from below of the battery housing 1. The lower sheet 6 is hidden to illustrate the following aspects in order to provide a clear view of the underside of the structural sheet 8. In the floor 3 shown in the figures, the two compartments separated by the longitudinal strut 4 for accommodating the battery modules are each connected to a coolant circuit. For the fluid connection, the parallel hollow chambers (18, 18' in FIG. 3) are connected to each other by a respective hollow chamber connector 19, designed as a U-shaped connecting piece, namely as alternating adjacent hollow chambers, in order to convey fluid from an inlet 20 to an outlet 21, through the sandwich construction of the floor 3, in a meandering manner. The fluid path of the hollow channels is provided equally in the other half of the floor, namely from inlet 20.1 to outlet 21.1, through a corresponding arrangement of hollow chamber connectors 19.1.

Figure 5:
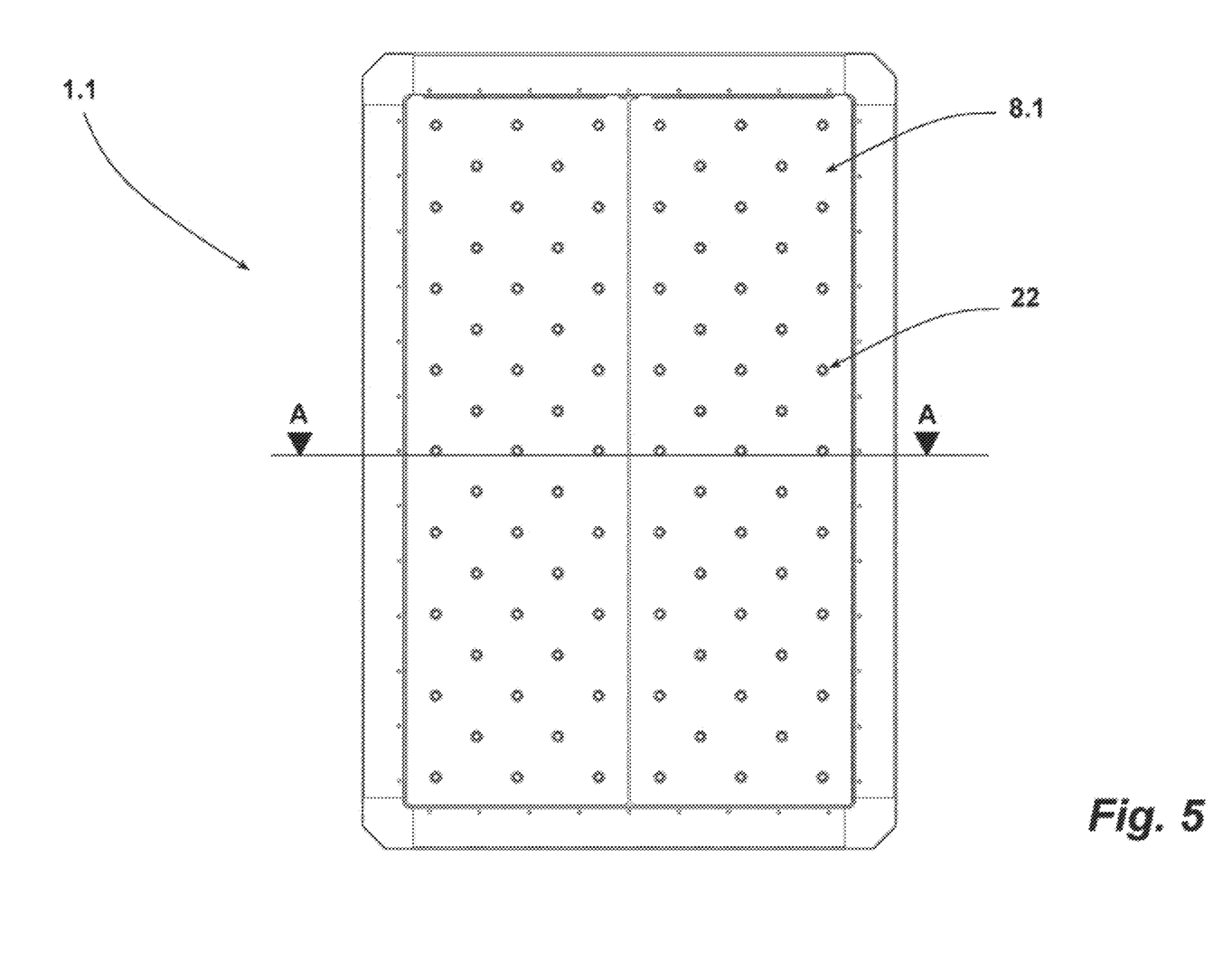
FIG. 5 is an underside view of another battery housing, with the lower sheet of the floor omitted.

FIG. 5 shows a further battery housing 1.1 in a view from below with the lower sheet hidden. The structural sheet 8.1 can be seen in a plan view. A plurality of support projections 22 are introduced into the structural sheet 8.1 by means of a deep-drawing process. The support projections 22 are offset with respect to one another in the manner of a grid in the longitudinal extension of the battery housing 1.1. As in the example embodiment of FIGS. 1 to 4, the first contact sections 9.1, 9.1' of the structural sheet 8.1 occupy a larger area than the second contact sections 11.1. In the example embodiment shown, the second contact surface 11.1, which is formed by the upper side of the support projections 22, is significantly smaller than the first contact surface 9.1, 9.1'. This becomes especially clear from the detail of a cross-section shown in FIG. 6 along sectional line A-A from FIG. 5. The lower sheet 6.1 is also shown in this view. The upper sheet 7.1 and the structural sheet 8.1 can also be seen. The support projections 22 can be considered knob-like in this embodiment. The first contact section 9.1 is connected to the second contact section 11.1 via a first bridging section 10.1. The second contact section 11.1 is connected to the following first contact section 9.1' via the second bridging section 12.1. In contrast to the example embodiment in FIGS. 1 to 4, these two bridging sections 10.1, 12.1 are actually a single circumferential bridging section. In the cross-sectional view shown in FIG. 6, the sequence of sections consists of a first contact section 9.1, a first bridging section 10.1, a second contact section 11.1, and a second bridging section 12.1, as is also the case with the subject matter of the example embodiment in FIGS. 1 to 4. This sequence repeats itself.

Figure 6:
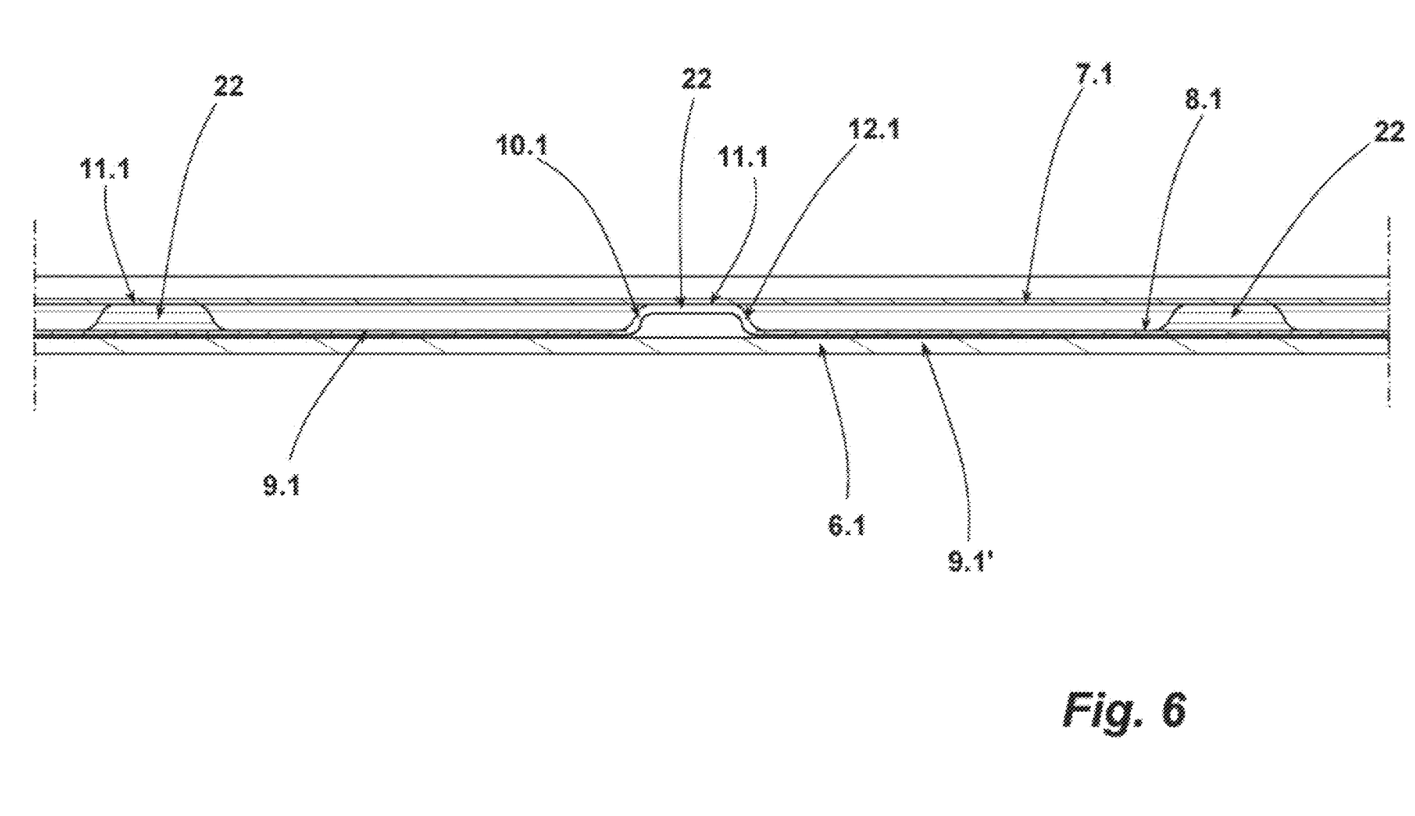
FIG. 6 is an enlarged section of a floor sandwich construction corresponding to the view of FIG. 3, but with respect to the battery housing shown in FIG. 5.

The hollow space formed between the upper sheet 7.1 and the structural sheet 8.1 can be used to conduct a temperature-control fluid. The temperature-control medium flows around the support projections 22.

Figure 7:
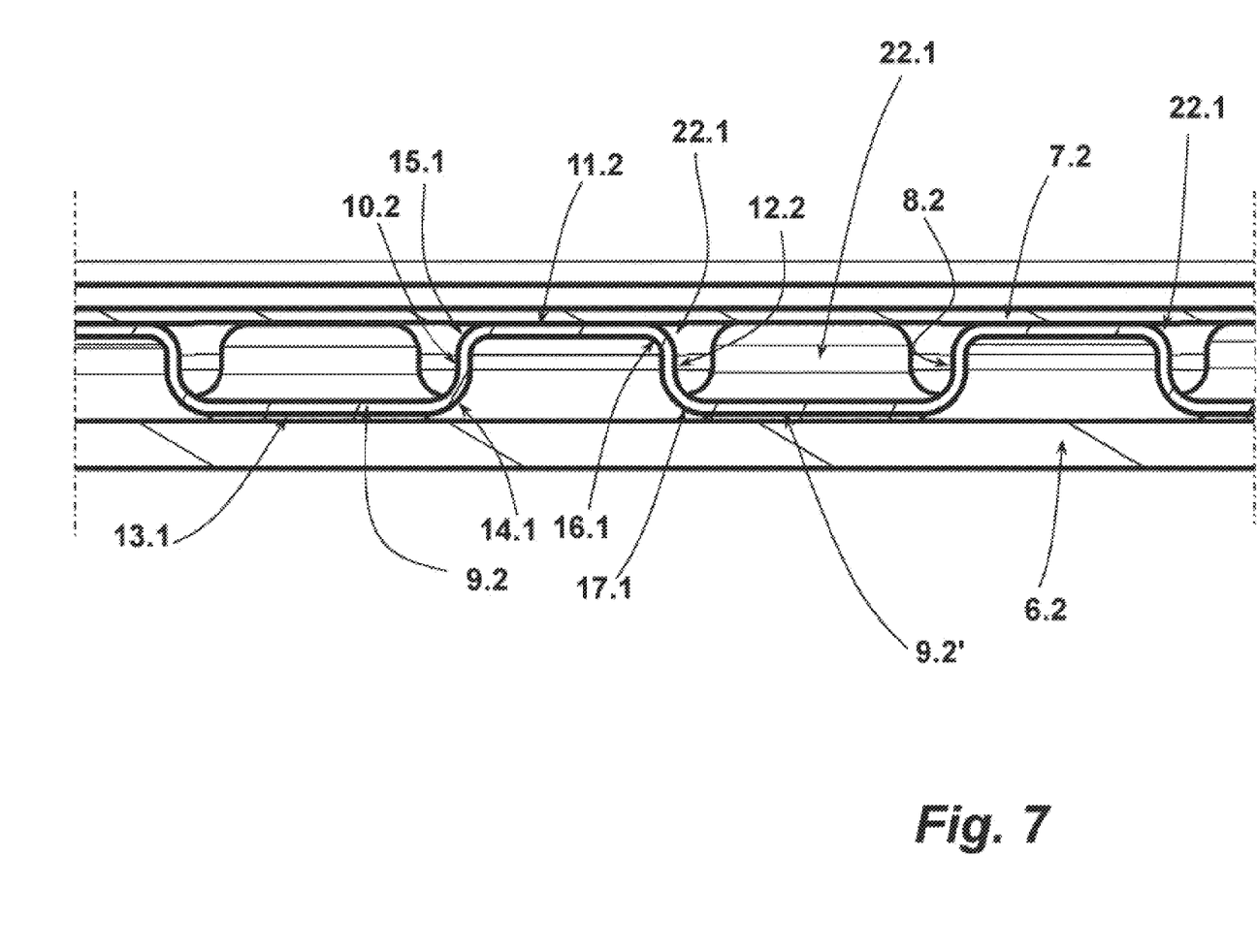
FIG. 7 is a section of the floor sandwich construction of a further battery housing corresponding to views of FIGS. 3 and 6.

FIG. 7 shows another embodiment of the battery housing 1.1 shown in FIGS. 5 and 6. In the case of the floor sandwich construction shown in FIG. 7 in a section of its cross-section, the support projections 22.1 are arranged in a tighter grid with respect to one another. In the cross-sectional view shown, in which the support projections 22.1 are shown at the maximum of the diameter thereof, the second contact sections 11.2 are significantly larger in diameter than the support projections 22 of the example embodiment in FIG. 6. In addition, the angle of bridging sections 10.2, 12.2 corresponds to the angle occupied by bridging sections 10, 12 in relation to the lower and upper sheets 6, 7 in the embodiment of FIGS. 1 to 4. In contrast, the angle of bridging sections 10.1, 10.2 is smaller in the embodiment of FIGS. 5 and 6. The narrower the grid of the support projections 22, 22.1 is designed, the stiffer the floor sandwich construction.

In this embodiment, too, the structural sheet 8.2 is connected to the lower sheet 6.2 by adhesive 13.1. The structural sheet 8.2 is connected to the upper sheet 7.2 with a soldered joint. This takes place over the entire width of the respective contact sections 9.2, 9.2', 11.2 resting against the sheets 6.2, 7.2, as has already been described for the example embodiment in FIGS. 1 to 4.

The invention has been described on the basis of several example embodiments. Without departing from the scope of protection, described by the claims, numerous further embodiments and options for implementing the concept of the invention are apparent to one skilled in the art, without these having to be explained or shown in more detail in the context of this disclosure.

| List of reference numerals | |
|---|---|
| 1, 1.1 | Battery housing |
| 2 | Frame |
| 3 | Floor |
| 4 | Longitudinal strut |
| 5 | Cross strut |
| 6, 6.1, 6.2 | Lower sheet |
| 7, 7.1, 7.2 | Upper sheet |
| 8, 8.1, 8.2 | Structural sheet |
| 9, 9', 9.1, 9.1', 9.2, 9.2' | First contact section |
| 10, 10.1, 10.2 | First bridging section |
| 11, 11.1, 11.2 | Second contact section |
| 12, 12.1, 12.2 | Second bridging section |
| 13, 13.1 | Adhesive |
| 14, 14.1, 15, 15.1, 16, 16.1, 17, 17.1 | Radius |
| 18, 18' | Hollow chamber |
| 19, 19.1 | Hollow chamber connector |
| 20, 20.1, 20.2 | Inlet |
| 21, 21.1 | Outlet |
| 22, 22.1 | Support projection |
| B1, B2 | Width of contact sections |
| D | Distance |
| F | Sequence |

The invention claimed is:

1. A battery housing for a vehicle driven by an electric motor, to be installed in a floor region of the vehicle, comprising:
 a frame enclosing at least one battery module and a floor connected to the frame, wherein the floor is equipped with collision protection, wherein the floor is designed as a sandwich construction which comprises a lower sheet, an upper sheet spaced apart from the lower sheet, and a structural sheet positioned in between and connected to the lower sheet and to the upper sheet,
 wherein the structural sheet is formed, at least in sections in its cross-section, from a repeating sequence comprising a first contact section, a first bridging section, a second contact section, and a second bridging section,
 wherein the first contact section is connected to the lower sheet and the second contact section is connected to the upper sheet, wherein the bridging sections each have a first contact section connected to the lower sheet with a second contact section connected to the upper sheet, and wherein the bridging sections extend over the entire longitudinal or transverse extension of the structural sheet,
 wherein hollow chambers formed by the upper sheet and the structural sheet with its bridging sections and the second contact sections connecting them are usable as temperature-control channels for conducting a fluid, and wherein end-side openings of adjacent hollow chambers are connected to one another at ends thereof in such a manner that the end-side openings of adjacent hollow chambers are connected to one another at the ends thereof offset in relation to one another, resulting in a meandering temperature-control line.

2. The battery housing of claim 1, wherein the upper sheet is thinner than the lower sheet.

3. The battery housing of claim 2, wherein the hollow chambers each open into a collector at the end-side.

4. The battery housing of claim 1, wherein the contact sections are connected to the respectively adjacent upper or lower sheet over their entire width.

5. The battery housing of claim 1, wherein the first contact sections of the structural sheet are glued to the lower sheet, and the second contact sections of the structural sheet are soldered to the upper sheet.

6. The battery housing of claim 1, wherein the first contact sections of the structural sheet have a smaller width than the second contact sections of the structural sheet.

7. The battery housing of claim 1, wherein the distance between the upper sheet and the lower sheet is several times smaller than the width of the contact sections of the structural sheet.

8. The battery housing of claim 1, wherein the bridging sections of the structural sheet are longer in a cross-section than a critical buckling length of same.

9. The battery housing of claim 1, wherein the bridging sections transition into the adjacent contact sections with a radius.

10. The battery housing of claim 1, wherein the bridging sections connect the contact sections to each other in the distance direction between the lower sheet and the upper sheet.

11. The battery housing of claim 1, wherein the structural sheet has support projections for forming the bridging sections and the contact sections.

12. The battery housing of claim 11, wherein such a support projection is knob-shaped with a circular outline.

13. The battery housing of claim 12, wherein the support projections are arranged in the manner of a grid in relation to one another.

14. The battery housing of claim 11, wherein the support projections are arranged in the manner of a grid in relation to one another.

* * * * *